(12) United States Patent
Goers et al.

(10) Patent No.: US 10,794,679 B2
(45) Date of Patent: Oct. 6, 2020

(54) METHOD AND SYSTEM FOR MEASURING GEOMETRIC PARAMETERS OF THROUGH HOLES

(71) Applicant: CORNING INCORPORATED, Corning, NY (US)

(72) Inventors: Uta-Barbara Goers, Campbell, NY (US); Robert Wendell Sharps, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 15/632,919

(22) Filed: Jun. 26, 2017

(65) Prior Publication Data

US 2018/0003477 A1 Jan. 4, 2018

Related U.S. Application Data

(60) Provisional application No. 62/356,091, filed on Jun. 29, 2016.

(51) Int. Cl.
*G01B 7/12* (2006.01)
*G01B 11/12* (2006.01)
*G01B 7/13* (2006.01)
*B60R 1/12* (2006.01)

(52) U.S. Cl.
CPC ............ *G01B 7/12* (2013.01); *G01B 7/13* (2013.01); *G01B 11/12* (2013.01); *B60R 2001/1253* (2013.01); *G06T 2207/10028* (2013.01)

(58) Field of Classification Search
CPC . G01B 7/12; G01B 7/13; G01B 11/12; G01B 11/08; G06T 2207/10028; B60R 2001/1253
See application file for complete search history.

(56) References Cited

U.S. PATENT DOCUMENTS

| 208,387 A | 9/1878 | Geoege |
| 237,571 A | 2/1881 | Messier |
| 3,798,013 A | 3/1974 | Hasegawa et al. |
| 4,395,271 A | 7/1983 | Beall et al. |
| 5,745,236 A * | 4/1998 | Haga ............... G01N 21/8806 356/237.1 |
| 5,746,884 A | 5/1998 | Gupta et al. |

(Continued)

FOREIGN PATENT DOCUMENTS

| CN | 100494879 C | 6/2009 |
| CN | 104897062 A | 9/2015 |

(Continued)

OTHER PUBLICATIONS

Zavyalov, "3D Hole Inspection Using Lens with High Field Curvature" Measurement Science Review, V. 15, No. 1, 2015. pp. 52-57.

(Continued)

*Primary Examiner* — Jonathan M Dunlap
(74) *Attorney, Agent, or Firm* — Amy T. Lang

(57) ABSTRACT

A method of measuring geometric parameters of through holes in a thin substrate includes acquiring images of select sub-volumes of the substrate using an optical system having a field of depth greater than a thickness of the substrate. The acquired images are processed to determine the desired geometric parameters.

14 Claims, 6 Drawing Sheets

(56) References Cited

U.S. PATENT DOCUMENTS

| | | | |
|---|---|---|---|
| 5,909,284 A * | 6/1999 | Nakamura | G01B 11/12 |
| | | | 356/635 |
| 5,933,230 A * | 8/1999 | Imaino | G01N 21/94 |
| | | | 356/237.2 |
| 6,072,624 A | 6/2000 | Dixon et al. | |
| 6,234,755 B1 * | 5/2001 | Bunker | F01D 5/186 |
| | | | 416/241 R |
| 6,344,242 B1 | 2/2002 | Stolk et al. | |
| 6,906,795 B2 * | 6/2005 | Goto | G01N 21/94 |
| | | | 356/237.6 |
| 7,019,257 B2 * | 3/2006 | Stevens | B23K 26/389 |
| | | | 219/121.71 |
| 7,043,072 B2 * | 5/2006 | Goto | G01N 21/94 |
| | | | 382/152 |
| 7,211,899 B2 | 5/2007 | Taniguchi et al. | |
| 7,407,889 B2 | 8/2008 | Tsunetomo et al. | |
| 7,528,967 B2 | 5/2009 | Okawauchi et al. | |
| 7,626,665 B2 | 12/2009 | Koike | |
| 7,683,370 B2 | 3/2010 | Kugimiya et al. | |
| 7,749,809 B2 | 7/2010 | How et al. | |
| 7,994,503 B2 | 8/2011 | Hino et al. | |
| 8,119,462 B2 | 2/2012 | Takasawa et al. | |
| 8,163,649 B2 | 4/2012 | Koike et al. | |
| 8,338,957 B2 | 12/2012 | Nilsson | |
| 8,384,083 B2 | 2/2013 | Mod et al. | |
| 8,411,459 B2 | 4/2013 | Yu et al. | |
| 8,482,189 B2 | 7/2013 | Goto et al. | |
| 8,531,679 B2 * | 9/2013 | Scheiner | G01B 11/22 |
| | | | 356/445 |
| 8,535,997 B2 | 9/2013 | Kawakami et al. | |
| 8,643,129 B2 | 2/2014 | Laming et al. | |
| 8,699,037 B2 | 4/2014 | Cox | |
| 8,742,588 B2 | 6/2014 | Nilsson et al. | |
| 8,871,641 B2 | 10/2014 | Nilsson | |
| 8,873,067 B2 | 10/2014 | Lee et al. | |
| 9,024,443 B2 | 5/2015 | Inaba et al. | |
| 9,093,381 B2 | 7/2015 | Barriere et al. | |
| 9,140,539 B2 * | 9/2015 | Scheiner | G01B 11/22 |
| 9,232,652 B2 | 1/2016 | Fushie et al. | |
| 9,278,886 B2 | 3/2016 | Boek et al. | |
| 9,296,646 B2 | 3/2016 | Burket et al. | |
| 9,305,470 B2 | 4/2016 | Miki et al. | |
| 9,346,706 B2 | 5/2016 | Bazemore et al. | |
| 9,377,583 B2 * | 6/2016 | Giaretta | G02B 6/25 |
| 9,517,963 B2 | 12/2016 | Marjanovic et al. | |
| 9,676,046 B2 * | 6/2017 | Hamada | B23H 9/10 |
| 9,745,220 B2 | 8/2017 | Burket et al. | |
| 9,760,986 B2 * | 9/2017 | Ramamurthy | G06K 9/4604 |
| 9,850,160 B2 | 12/2017 | Marjanovic et al. | |
| 10,144,093 B2 | 12/2018 | Marjanovic et al. | |
| 10,203,476 B2 * | 2/2019 | Cui | G02B 9/16 |
| 2002/0051563 A1 * | 5/2002 | Goto | G01N 21/94 |
| | | | 382/141 |
| 2002/0180015 A1 | 12/2002 | Yamaguchi et al. | |
| 2003/0206651 A1 * | 11/2003 | Goto | G01N 21/94 |
| | | | 382/152 |
| 2004/0058476 A1 | 3/2004 | Enquist et al. | |
| 2004/0094524 A1 * | 5/2004 | Stevens | B23K 26/389 |
| | | | 219/121.71 |
| 2004/0256619 A1 | 12/2004 | Nomura et al. | |
| 2005/0029238 A1 | 2/2005 | Chen | |
| 2005/0033184 A1 | 2/2005 | Christoph | |
| 2005/0079650 A1 | 4/2005 | Mancini et al. | |
| 2005/0266320 A1 | 12/2005 | Amemiya | |
| 2006/0012766 A1 * | 1/2006 | Klosner | G03F 7/70275 |
| | | | 355/67 |
| 2006/0192978 A1 * | 8/2006 | Laguarta Bertran | G01B 11/12 |
| | | | 356/601 |
| 2009/0029189 A1 | 1/2009 | Moriwaki et al. | |
| 2009/0032510 A1 | 2/2009 | Ando et al. | |
| 2010/0133697 A1 | 6/2010 | Nilsson | |
| 2010/0284027 A1 * | 11/2010 | Scheiner | G01B 11/22 |
| | | | 356/626 |
| 2011/0032467 A1 | 2/2011 | Koike | |
| 2011/0132883 A1 * | 6/2011 | Sheng | B23K 26/032 |
| | | | 219/121.72 |
| 2011/0308942 A1 | 12/2011 | Liu et al. | |
| 2012/0048604 A1 | 3/2012 | Cornejo et al. | |
| 2012/0092681 A1 | 4/2012 | Cox | |
| 2012/0125892 A1 | 5/2012 | Shimoi et al. | |
| 2012/0125893 A1 | 5/2012 | Shimoi et al. | |
| 2012/0168412 A1 | 7/2012 | Hooper | |
| 2012/0235969 A1 | 9/2012 | Burns et al. | |
| 2012/0241919 A1 | 9/2012 | Mitani | |
| 2012/0276743 A1 | 11/2012 | Won et al. | |
| 2013/0050226 A1 | 2/2013 | Shenoy et al. | |
| 2013/0089701 A1 | 4/2013 | Hooper et al. | |
| 2013/0105213 A1 | 5/2013 | Hu et al. | |
| 2013/0163801 A1 | 6/2013 | Ha et al. | |
| 2013/0205835 A1 * | 8/2013 | Giaretta | G02B 6/25 |
| | | | 65/378 |
| 2013/0224492 A1 | 8/2013 | Bookbinder et al. | |
| 2013/0228918 A1 | 9/2013 | Chen et al. | |
| 2013/0330515 A1 | 12/2013 | Oh et al. | |
| 2013/0337599 A1 | 12/2013 | Yun | |
| 2014/0147623 A1 | 5/2014 | Shorey et al. | |
| 2014/0147624 A1 | 5/2014 | Streltsov et al. | |
| 2014/0154439 A1 | 6/2014 | DeMartino et al. | |
| 2014/0166199 A1 | 6/2014 | Bellman et al. | |
| 2014/0170378 A1 | 6/2014 | Bellman et al. | |
| 2014/0199519 A1 | 7/2014 | Schillinger et al. | |
| 2014/0254004 A1 * | 9/2014 | Wooder | G02B 21/12 |
| | | | 359/385 |
| 2014/0300728 A1 * | 10/2014 | Drescher | G01N 21/95692 |
| | | | 348/92 |
| 2014/0376006 A1 * | 12/2014 | Scheiner | G01B 11/22 |
| | | | 356/626 |
| 2015/0036065 A1 | 2/2015 | Yousefpor et al. | |
| 2015/0060402 A1 | 3/2015 | Burkett et al. | |
| 2015/0102498 A1 | 4/2015 | Enicks et al. | |
| 2015/0166393 A1 | 6/2015 | Marjanovic et al. | |
| 2015/0166395 A1 | 6/2015 | Marjanovic et al. | |
| 2015/0166396 A1 | 6/2015 | Marjanovic et al. | |
| 2015/0274583 A1 | 10/2015 | An et al. | |
| 2015/0306847 A1 | 10/2015 | Bellman et al. | |
| 2015/0329415 A1 | 11/2015 | Bellman et al. | |
| 2016/0026842 A1 | 1/2016 | Withers et al. | |
| 2016/0107925 A1 | 4/2016 | Burket et al. | |
| 2016/0166395 A9 | 6/2016 | Weiman | |
| 2016/0199944 A1 | 7/2016 | Hosseini | |
| 2016/0201474 A1 * | 7/2016 | Slavens | F01D 5/186 |
| | | | 60/806 |
| 2016/0204126 A1 | 7/2016 | Amano | |
| 2016/0208387 A1 | 7/2016 | Liu et al. | |
| 2016/0219704 A1 | 7/2016 | Vandemeer et al. | |
| 2016/0237571 A1 | 8/2016 | Liu et al. | |
| 2016/0282584 A1 * | 9/2016 | Cui | G02B 9/16 |
| 2016/0289669 A1 * | 10/2016 | Fan | C12Q 1/6874 |
| 2016/0305764 A1 * | 10/2016 | Cui | G01B 5/012 |
| 2016/0312365 A1 | 10/2016 | Cordonier et al. | |
| 2016/0327744 A1 * | 11/2016 | Giaretta | G02B 6/25 |
| 2016/0334203 A1 * | 11/2016 | Cui | G01B 5/012 |
| 2016/0351410 A1 | 12/2016 | Fu et al. | |
| 2016/0368100 A1 | 12/2016 | Marjanovic et al. | |
| 2017/0008122 A1 | 1/2017 | Wieland et al. | |
| 2017/0036419 A1 | 2/2017 | Adib et al. | |
| 2017/0160077 A1 * | 6/2017 | Featherstone | G01B 11/24 |
| 2017/0228884 A1 * | 8/2017 | Yoshida | G06T 7/62 |
| 2017/0252859 A1 | 9/2017 | Kumkar et al. | |
| 2017/0276951 A1 | 9/2017 | Kumkar et al. | |
| 2017/0363417 A1 * | 12/2017 | Cui | G01B 11/007 |
| 2018/0033128 A1 * | 2/2018 | Sobieranski | G06T 5/50 |
| 2018/0057390 A1 | 3/2018 | Heckert et al. | |
| 2018/0062342 A1 | 3/2018 | Comstock, II et al. | |
| 2018/0068868 A1 | 3/2018 | Jaramillo et al. | |
| 2018/0093914 A1 | 4/2018 | Akarapu et al. | |
| 2018/0215647 A1 | 8/2018 | Ortner et al. | |

FOREIGN PATENT DOCUMENTS

| | | |
|---|---|---|
| EP | 247993 A1 | 12/1987 |
| EP | 280918 A2 | 9/1988 |

(56) References Cited

FOREIGN PATENT DOCUMENTS

| | | |
|---|---|---|
| EP | 3166372 A1 | 5/2017 |
| JP | 2003148931 A | 5/2003 |
| JP | 2004363212 A | 12/2004 |
| JP | 2005257339 A | 9/2005 |
| JP | 2008288577 A | 11/2008 |
| JP | 2010074017 A | 4/2010 |
| JP | 2011178642 A | 9/2011 |
| JP | 2013220958 A | 10/2013 |
| JP | 2015146410 A | 8/2015 |
| WO | 03021004 A1 | 3/2003 |
| WO | 2008110061 A1 | 9/2008 |
| WO | 2015113023 A1 | 7/2015 |
| WO | 2015157202 A1 | 10/2015 |
| WO | 2016010954 A2 | 1/2016 |
| WO | 2016089844 A1 | 6/2016 |
| WO | 2016118683 A1 | 7/2016 |
| WO | 2016176171 A1 | 11/2016 |
| WO | 2017038075 A1 | 3/2017 |
| WO | 2017062798 A1 | 4/2017 |
| WO | 2018162385 A1 | 9/2018 |

OTHER PUBLICATIONS

Chen et al. "Development of an AOI system for chips with a hole on backside based on a frame imager" Proc. of SPIE vol. 9903, 2016. 6 pgs. (Jan. 26, 2016).

Wakayama et al. "Small size probe for inner profile measurement of pipes using optical fiber ring beam device" Proc. of SPIE vol. 8563, 2012. 7 pgs.

International Search Report of the International Searching Authority; PCT/US2017/039360; dated Aug. 11, 2017; 12 Pages; European Patent Office.

Benjamin et al; "The Adhesion of Evaporated Metal Films on Glass" ; Proc. Roy. Soc. A., vol. 261, (1962); p. 516-531.

Borghi et al; "M2 Factor of Bessel-Gauss Beams" ; Optics Letters; vol. 22, No. 5; (1997) p. 262-264

Iijima et al; "Resistivity Reduction by External Oxidation of Cu—Mn Alloy Films for Semiconductor Interconnect Application"; Journal of Vacuum Science & Technology B: Microelectronics and Nanometer Structures Processing, Measurement, and Phenomena, 27, 1963-1968 (2009).

Intergrace, "Borosilicate glass: technical glass by Pulles & Hanique: Duan & Pyrex," Pulles & Hanique B.V., 2 pgs. Published Mar. 15, 2012, retrieved from: https://web.archive.org/web/20120315092729/http://www.pulleshanique.com/02_borosilicate-glass.htm.

Kiyama et al; "Examination of Etching Agent and Etching Mechanism on Femtosecond Laser Microfabrication of Channels Inside Vitreous Silica Substrates"; J. Phys. Chem. C, 2009, 113, pp. 11560-11566.

Koike et al; "P-33: Cu—Mn Electrodes for a-Si TFT and Its Electrical Characteristics"; SID Symposium Digest of Technical Papers, 41:1, 1343- 1346 (2010).

Koike et al; "Self-Forming Diffusion Barrier Layer in Cu—Mn Alloy Metallization" Appl. Phys. Lett. 87, 041911-1-041911-3 (2005).

Microchemicals, "Silicon Wafers, Quartz Wafers, Glass Wafers," Product Specifications: Brochure. 2014, 28 pgs.

Ogutu et al; "Superconformal Filling of High Aspect Ratio Through Glass Vias (TGV) for Interposer Applications Using TNBT and NTBC Additives"; Journal of the Electrochemical Society, 162 (9), D457-D464 (2015).

Yun et al; "P-23:The Contact Properties and TFT Structures of A-IGZO TFTS Combined With Cu—Mn Alloy Electrodes"; SID Symposium Digest of Technical Papers 42:1, 1177-1180, 2011.

Shorey et al; "Progress and Application of Through Glass Via (TGV) Technology"; 2016 PAN Pacific Microelectronis Symposium, SMTA, January 25, 2016; p. 1-6.

Shorey; "Leveraging Glass for Advanced Packaging and IoT"; Apr. 21, 2016, Retrieved Form the Internet: URL:http://www.corning.com/media/worldwide/cdt/documents/iMAPs%20-%20Corning%20Overview%20-%204-21-16%20FINALpptx.pdf.

Siegman; "New Development in Laser Resonators"; SPIE, vol. 1227, Optical Resonators (1990) p. 2-14.

Thiele; "Relation Between Catalytic Activity and Size of Particle"; Industrial and Engineering Chemistry, vol. 31, No. 7; (1939) p. 916-920.

Topper et al; "3-D Thin Film Interposer Based on TGV (Through Glass Vias): An Alternative to Si-Interposer"; IEEE, Electronic Components and Technology Conference; 2010; p. 66-73.

U.S. Appl. No. 62/846,059; Cai et al. "Silicate Glass Compositions Useful for the Efficient Production of Through Glass Vias", Filed May 10, 2019, 43 pgs.

U.S. Appl. No. 62/846,102; Guo et al. "High Silicate Glass Articles Possessing Through Glass Vias and Methods of Making and Using Thereof", Filed May 10, 2019,36 pgs.

Wu et al, "A Study on Annealing Mechanisms With Different Manganese Contents in CuMn Alloy"; Journal of Alloys and Compounds, vol. 542, 2012, p. 118-123.

\* cited by examiner

METHOD AND SYSTEM FOR MEASURING GEOMETRIC PARAMETERS OF THROUGH HOLES

CROSS-REFERENCE TO RELATED APPLICATIONS

This application claims the benefit of priority under 35 U.S.C. § 119 of U.S. Provisional Application Ser. No. 62/356,091 filed on Jun. 29, 2016, the content of which is relied upon and incorporated herein by reference in its entirety.

FIELD

The present disclosure relates to measurement of geometric parameters of through holes in substrates.

BACKGROUND

Typically, small geometric features with diameters below 100 microns are measured using a microscope or an Optical Coordinate Measuring Machine (OCMM). These systems typically use high optical magnification objective lenses to resolve small features, and because of the small depth of field of the lens, measurements are limited to features on or near the surface of the object. Microscope objective lens are designed to work at specific conjugate points, and their aberration corrections will suffer significantly if they are used at other distances, resulting in a distorted image. Commonly, object depth or shape information can be acquired using scanning electron microscopy or 3D confocal microscopy, but these methods are destructive and slow and cannot be used to inspect thousands of features quickly.

SUMMARY

A method and system for measuring geometric parameters of through holes in thin substrates are disclosed herein. The method is non-destructive, and the method and system can be automated to provide inspection of hundreds to thousands of holes in a matter of minutes. The method and system can be used to measure geometric parameters, such as clear aperture size and the like, of all types of hole profiles, such as straight, tapered, hour glass, and the like. The term "clear aperture" refers to the clear unobstructed opening of a hole when looking through the hole under normal incidence. For a straight hole, where the diameter of the hole is uniform, the clear aperture size is the same as the diameter of the hole. For other types of holes, such as a hour glass hole or tapered hole, the clear aperture size is defined by the minimum transverse dimension of the hole. The minimum transverse dimension would be located at the narrowest point, or waist, of the hole. The method and system can measure the clear aperture size of every hole, independent of the depth at which the clear aperture occurs. Even if the clear aperture size and depth show large variations across a substrate, the method and system will not require any adjustments or refocusing during the measurement.

In a first aspect, a method of measuring geometric parameters of through holes in a substrate includes positioning a camera comprising an image sensor and a lens having a depth of field greater than the thickness of the substrate at a measuring station. The method includes positioning a select sub-volume of the substrate within a field of view of the camera and within the depth of range. The method includes illuminating the select sub-volume. The method includes capturing an image of the select sub-volume on the image sensor and processing the image to determine at least one geometric parameter of at least one through hole in the select sub-volume.

A second aspect of this disclosure includes the method as described in the first aspect, where the at least one geometric parameter is a clear aperture size of the at least one through hole.

A third aspect of this disclosure includes the method as described in the first or second aspect, where the substrate has a thickness of 1 mm or less.

A fourth aspect of this disclosure includes the method as described in any of the first to the third aspects, wherein the lens is a telecentric lens.

A fifth aspect of this disclosure includes the method as described in the fourth aspect, wherein the illuminating the select sub-volume comprises using collimated light.

A sixth aspect of this disclosure includes the method as described in any one of the first to the fifth aspects, where the select sub-volume has a front side and a back side, the front side is positioned in opposing relation to the lens, and the select sub-volume is illuminated by directing light at the front side of the select sub-volume.

A seventh aspect of this disclosure includes the method as described in the fifth aspect, where the light is directed at the front side of the select sub-volume by passing the light through the telecentric lens to the front side of the select sub-volume.

An eighth aspect of this disclosure includes the method as described in the fourth or fifth aspect, where illuminating the select sub-volume further includes reflecting the light into the select sub-volume using a mirror mounted at the back side of the select sub-volume.

A ninth aspect of this disclosure includes the method as described in any one of the first to the fifth aspects, where the select sub-volume has a front side and a back side, the front side is positioned in opposing relation to the lens, and the select sub-volume is illuminated by directing light at the back side of the select sub-volume.

A tenth aspect of this disclosure includes the method as described in any one of the first to the ninth aspects. The tenth aspect further includes effecting a relative motion between the camera and the substrate to position a new sub-volume of the substrate within the field of view of the camera and within the depth of field.

An eleventh aspect of this disclosure includes the method as described in the tenth aspect. The eleventh aspect further includes illuminating the new sub-volume with the light, capturing an image of the new sub-volume on the image sensor, and processing the image of the new sub-volume to determine at least one geometric parameter of at least one through hole in the new sub-volume.

A twelfth aspect of this disclosure includes the method as described in the eleventh aspect, where illuminating the new sub-volume includes effecting a relative motion between a source of the light and the substrate such that the new sub-volume is within an illumination volume of the light.

A thirteenth aspect of this disclosure includes the method as described in any one of the first to the twelfth aspects, where processing the image includes detecting changes in contrast in the image.

In a fourteenth aspect, a system of measuring geometric parameters of through holes in a substrate includes a camera comprising an image sensor and a lens having a depth of field greater than a thickness of the substrate. The camera is positioned relative to the substrate such that a select sub-volume of the substrate is within a field of view of the camera and within the depth of field. The system includes a lighting arrangement for illuminating the select sub-volume. The system further includes a processor configured to receive image data from the camera and determine from the image data at least one geometric parameter of at least one through hole in the select sub-volume.

A fifteenth aspect of this disclosure includes the system as described in the fourteenth aspect, wherein the lens is a telecentric lens.

A sixteenth aspect of this disclosure includes the system as described in the fourteenth or fifteenth aspect, wherein the lighting arrangement is a collimated lighting arrangement.

A seventeenth aspect of this disclosure includes the system as described in any one of the fourteenth to sixteenth aspects, where the select sub-volume has a front side and a back side, where the front side is in opposing relation relative to the lens, and where the lighting arrangement includes a light source positioned to direct a light beam at the back side of the select sub-volume.

An eighteenth aspect of this disclosure includes the system as described in any one of the twelfth to sixteenth aspects, where the select sub-volume has a front side and a back side, where the front side is in opposing relation to the lens, and where the lighting arrangement includes a coaxial light source optically coupled to the lens.

A nineteenth aspect of this disclosure includes the system as described in the eighteenth aspect, where the lighting arrangement further includes a mirror mounted in contact with a backside of the select sub-volume.

A twentieth aspect of this disclosure includes the system as described in the nineteenth aspect, where the mirror extends across a back side of the substrate including the back side of the select sub-volume.

A twenty-first aspect of this disclosure includes the system as described in any one of the fourteenth to the twentieth aspects. The twenty-first aspect further includes a translation mechanism coupled to the substrate and operable to translate the substrate relative to the camera.

A twenty-second aspect of this disclosure includes the system as described in any one of the fourteenth to the twenty-first aspects, where the processor is configured to determine a clear aperture size of the at least one through hole from the image data.

BRIEF DESCRIPTION OF DRAWINGS

The following is a description of the figures in the accompanying drawings. The figures are not necessarily to scale, and certain figures and certain views of the figures may be shown exaggerated in scale or in schematic in the interest of clarity and conciseness.

DETAILED DESCRIPTION

Figure 1A:
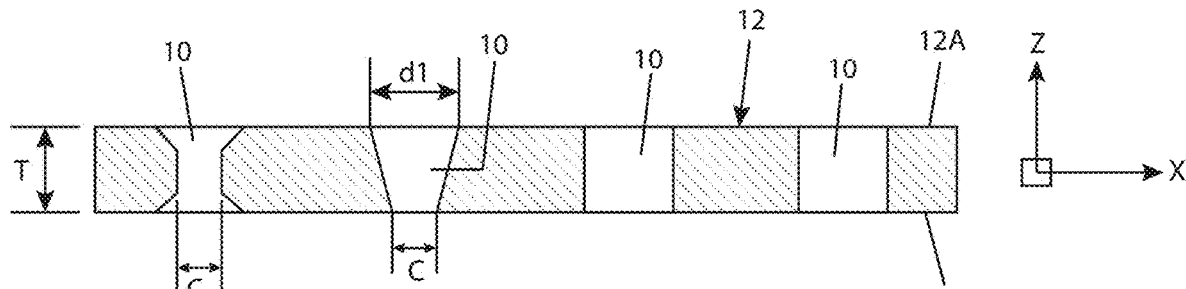
FIG. 1A is a cross-section of an example substrate having through holes.
Figure 1B:
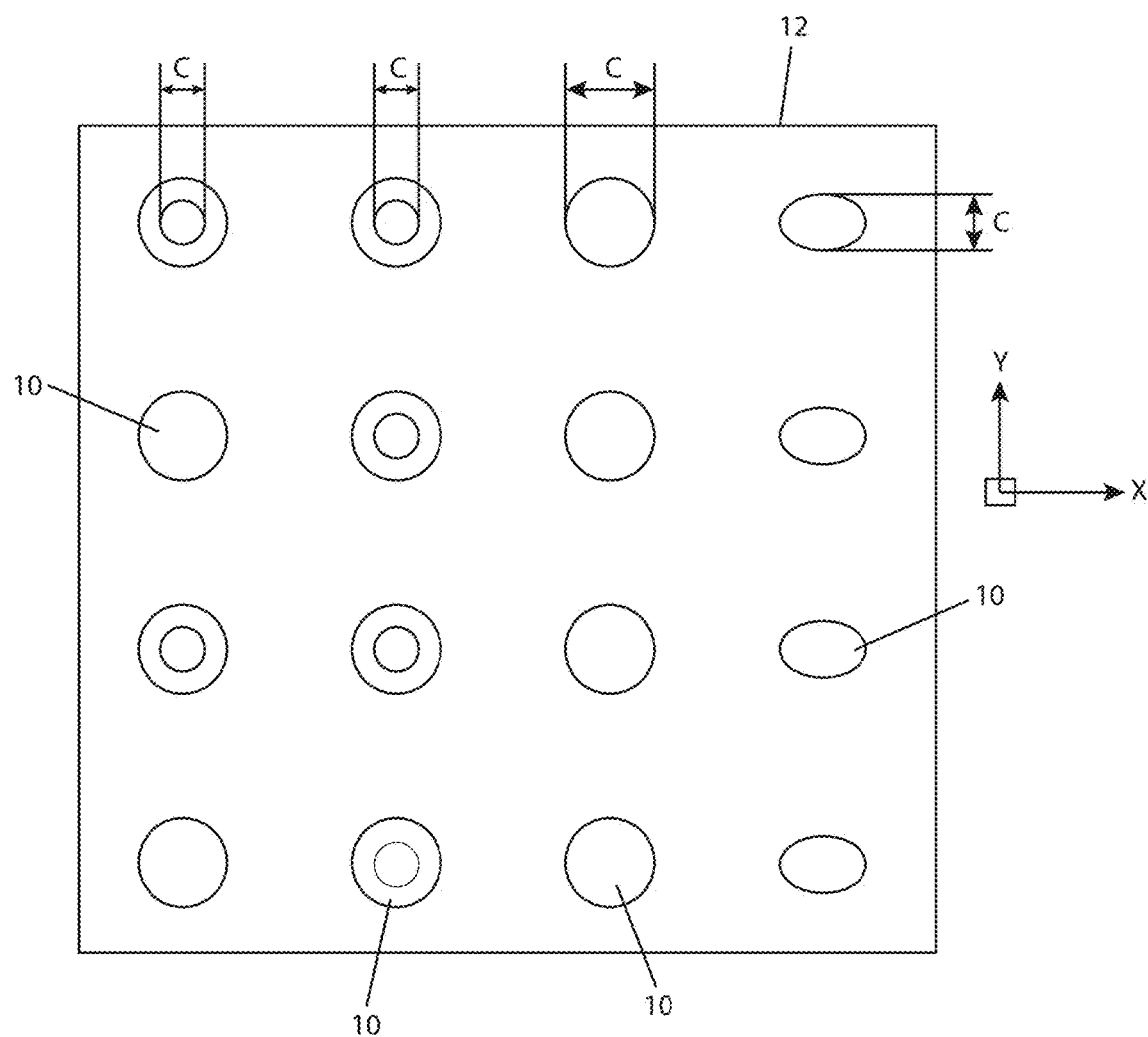
FIG. 1B is a top view of the substrate shown in FIG. 1A.

To provide a context for the method and system disclosed herein, FIGS. 1A and 1B illustrate geometric parameters of example through holes 10 formed in an example substrate 12. The through holes 10 are holes that run along the thickness (T) of the substrate 12 or from the front side 12A of the substrate 12 to the back side 12B of the substrate 12. Along the thickness (T) of the substrate 12, i.e., along the Z axis, the through holes 10 may have any desired shape, such as straight, tapered, or hourglass. In the plane of the substrate 12, i.e., in the XY plane, the through holes 10 may have any desired cross-sectional shape, such as circular, square, or elliptical. One of the hole geometric parameters that may be measured is clear aperture size. The clear aperture of a through hole is the aperture of the path through the through hole where light can travel unobstructed. The clear aperture size of a through hole 10 may be defined as the minimum distance diameter, or minimum transverse dimension, (C) of the through hole 10. Examples of other hole geometric parameters that may be measured are maximum diameter (d1) of the through hole 10, average diameter of the through hole 10, aspect ratio of the through hole 10, and direction of a major axis of the through hole 10.

Figure 2A:
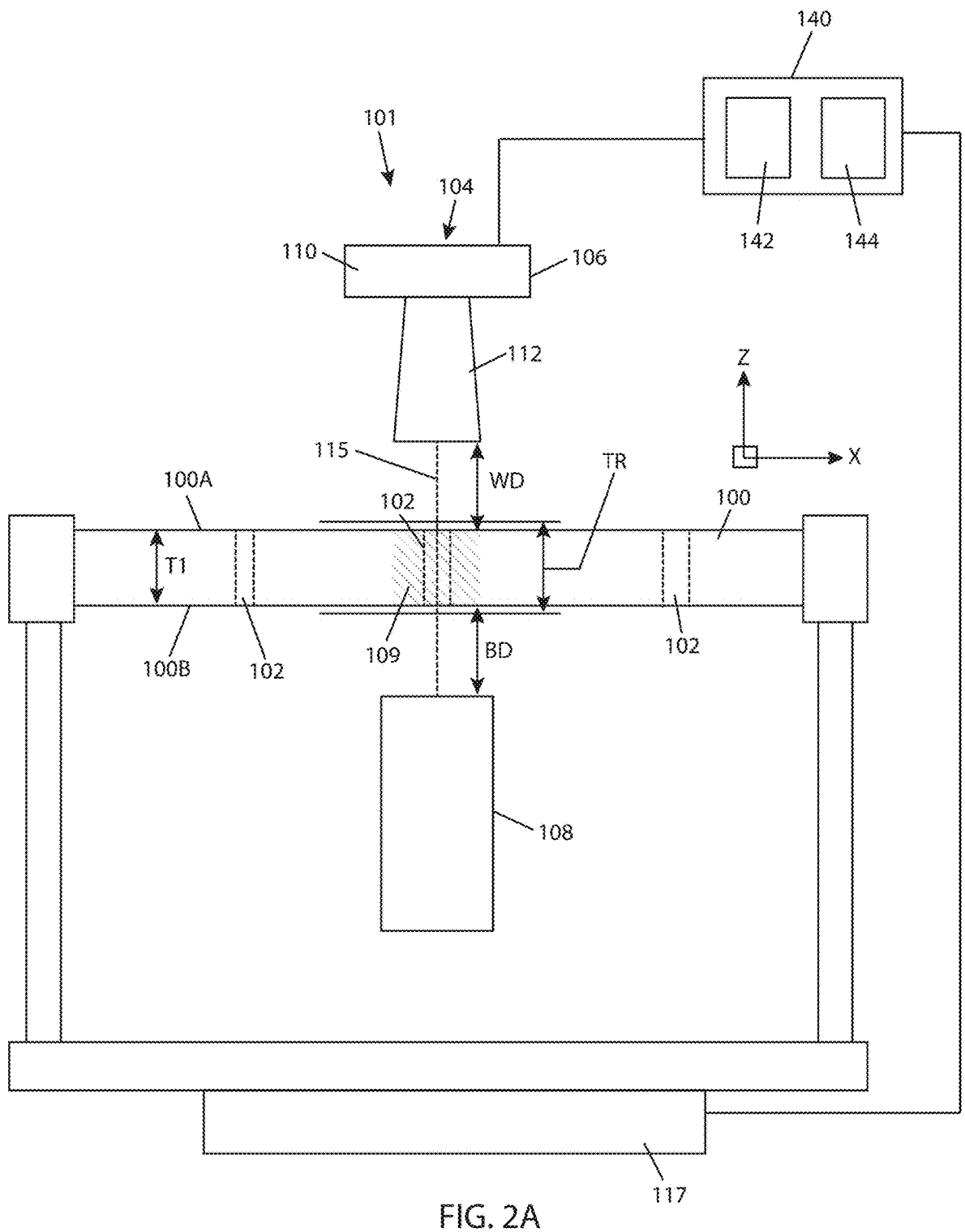
FIG. 2A is a diagram of a system for measuring geometric parameters of through holes in a substrate.

FIG. 2A shows a measurement system 101 including an imaging apparatus 104 for acquiring images of through holes in a substrate according to one embodiment. The images acquired by the imaging apparatus 104 can be processed to determine any of the hole geometric parameters discussed above. For illustration purposes, FIG. 2A shows a sample substrate 100 having through holes 102 and a thickness T1, which is also the depth of the through holes 102. Although only a few through holes 102 are shown in the substrate 100, more commonly, a sample substrate will have numerous through holes, e.g., ranging from tens to thousands of holes. The measurement system 101 is not limited to any number of through holes in the substrate 100. Although the through holes 102 are shown as straight holes having a circular cross-section (see FIG. 2B), the measurement system of 101 is also not limited to any particular shape of through holes or orientation of through holes in the substrate. The through holes in the substrate 100 may have any of the shapes discussed above and other shapes not specifically mentioned above. In one embodiment, the substrate 100 is a thin substrate having a thickness of 1 mm or less, although the thickness of the substrate will generally only be limited by the depth of field of the imaging apparatus 104. In FIG. 2A, the through holes 102 are exaggerated in size (diameter) relative to the field of view of the imaging apparatus 104. For most applications justifying the cost of the measurement system, the through holes 102 in the sample substrate 100 will typically be micron-sized, although the size of the through holes 102 will generally only be limited by the field of view and the resolution of the imaging apparatus 104.

In one embodiment, the imaging apparatus 104 includes a camera 106 and a backlight illuminator 108 arranged on opposite sides of the substrate 100, and particularly on opposite sides of a target sub-volume 109 of the substrate 100. The target sub-volume 109 includes one or more through holes 102 whose geometric parameters are to be measured. In one embodiment, the camera 106 includes an image sensor 110 and an objective lens 112 optically coupled to the image sensor 110. In one embodiment, the image sensor 110 has a pixel count of at least 10 megapixels (MP), allowing the camera 106 to capture high resolution images. However, the size of the image sensor 110 will generally be dictated by the desired accuracy of the measurement. For example, if a 100 micron geometric feature is to be measured with 1 micron accuracy, the image pixel size should be close to 1 micron. Image pixel size is a function of the physical size of the image sensor pixel and the magnification of the objective lens. In some embodiments, the objective lens 112 is a telecentric lens. Reasons for selecting a telecentric lens as the objective lens 112 are discussed below.

Conventional lenses have angular fields of view, which means that as the distance between the lens and object increases, the magnification decreases. This angular field of view results in parallax error, also known as perspective error. Telecentric lenses eliminate this parallax error by having a constant, non-angular field of view. With telecentric lenses, magnification remains constant with object displacement, provided the object stays within the telecentric range. The term "telecentric range" or "telecentric depth" or "depth of field (DOF)", as used with telecentric lenses, refers to the total distance above and below an object that remains in focus and at constant magnification. Telecentric range may be defined as a range of axial displacements causing a variation in image size of less than 1 micron. The telecentric range (or telecentric depth or DOF) of a telecentric lens can be obtained from the lens manufacturer or may be included in the specification of the telecentric lens.

By using a telecentric lens as the objective lens 112, according to one embodiment, virtually distortion free images can be acquired and used to accurately determine the desired geometric parameters of the through holes in the substrate 100. In one embodiment, the telecentric objective lens 112 has a telecentric range (TR in FIG. 2A), that is greater than the thickness T1 of the substrate 100. A procedure for selecting the telecentric objective lens 112 may include finding telecentric lenses from commercial sources (for example Opto Engineering) that meet the telecentric range requirement stated above. From this set of telecentric lenses, the telecentric lens with the highest magnification can be selected for use as the telecentric objective lens 112. For measurement of hole geometric parameters using the selected telecentric lens, the working distance WD, which is the distance between the front surface of the telecentric lens 112 and the front surface 100A of the substrate 100, is adjusted such that the target sub-volume 109 of the substrate 100 lies entirely within the telecentric range. The manufacturer's specification for the telecentric lens will typically include the working distance for the selected magnification and telecentric range (or DOF or telecentric depth).

In one embodiment, the backlight illuminator 108 is used to produce a sharp silhouetted image of the holes to be measured. For the telecentric lens 112, the backlight illuminator 108 can be a telecentric illuminator, which is a collimated illuminator that is designed to work specifically with telecentric lenses. Telecentric illuminators are available commercially (for example, from Opto Engineering). The telecentric illuminator 108 will uniformly illuminate the target sub-volume 109 of the substrate 100 with a collimated light beam. The illumination volume must be the size of the target sub-volume 109 or bigger to assure illumination of the entire field of view. For the arrangement shown in FIG. 2A, the optical axes of the backlight illuminator 108 and telecentric lens 112 are aligned. The distance BD of the backlight illuminator 108 from the back surface 100B of the substrate 100 may be selected to achieve a desired illumination of the target sub-volume 109 of the substrate 100.

Figure 3:
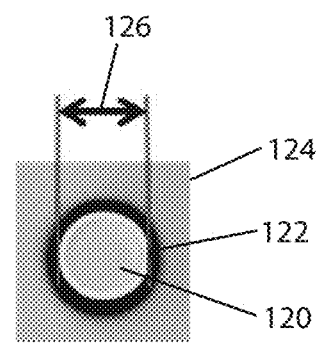
FIG. 3 is an image of a hole acquired by the method of FIG. 1.

FIG. 3 shows an example of a silhouetted image, where the through hole in the target sub-volume appears as a light spot 120 surrounded by a dark ring 122 in a transparent substrate 124. The dark ring 122 is the superimposed area of sidewalls as seen when looking into the hole. The more the sidewalls are tapered and distinctly different from a cylinder, the thicker the dark ring will appear in the image. For a straight hole, the diameter 126 of the light spot 120 will indicate the clear aperture size of the hole. The clear aperture size can be measured by counting the pixels corresponding to the diameter 126.

Figure 4:
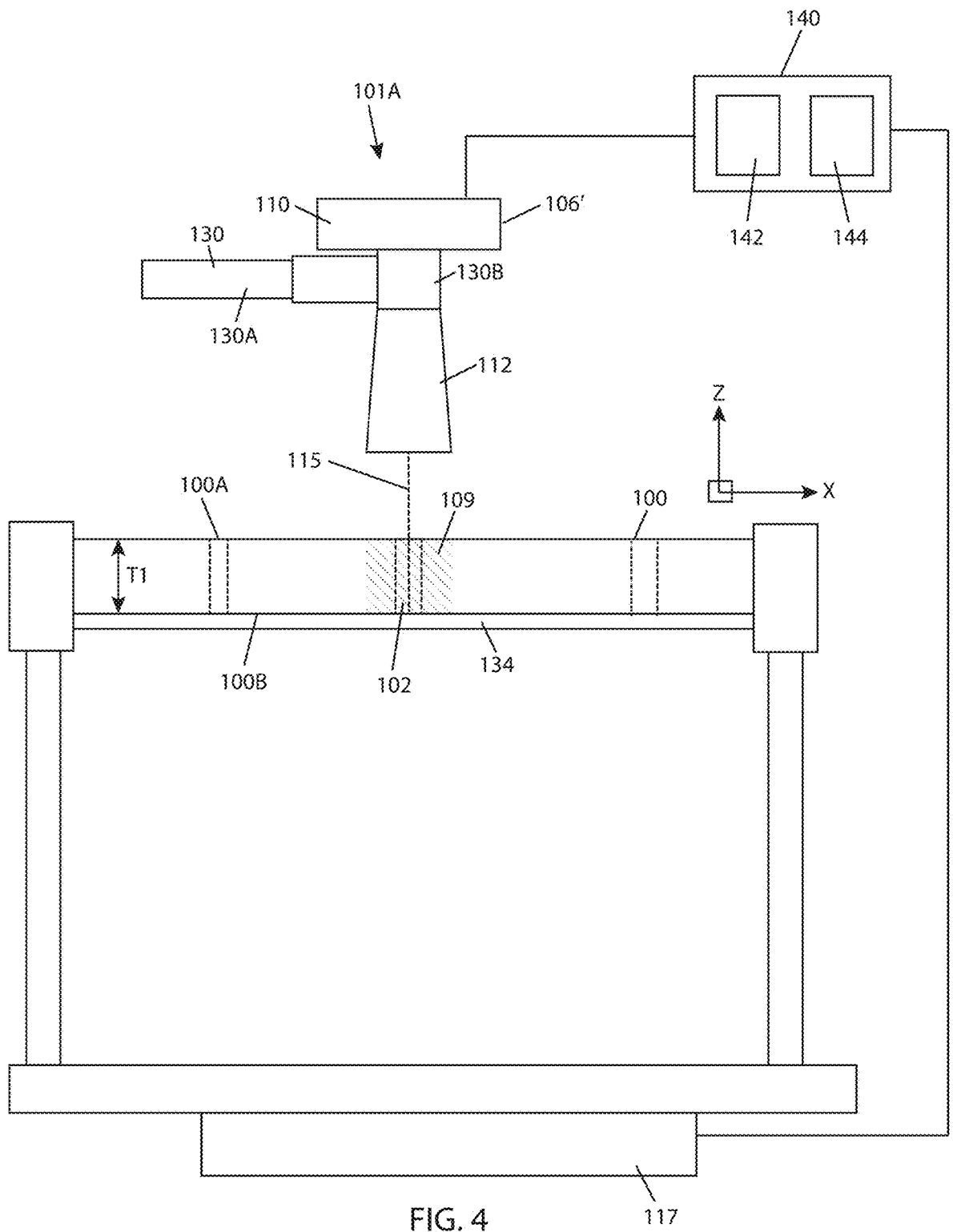
FIG. 4 is a diagram of another system for measuring geometric parameters of through holes in a substrate.

FIG. 4 shows a modified system 101A including a different lighting arrangement that may be used with the telecentric lens 112. The different lighting arrangement includes a coaxial light source 130 arranged on the same side of the substrate 100 as the camera 106'. The coaxial light source 130 may include a light source 130A and optics module 130B for aligning the light from the light source 130A in a direction generally parallel to the optical axis 115 of the telecentric lens 112. For example, the optics module 130B may include a beam splitter. The optics module 130B may be arranged in line with the telecentric lens 112 and image sensor 110, as shown in FIG. 4. The different lighting arrangement may further include a mirror 134 arranged in contact with the back surface 100B of the substrate 100. The mirror 134 will reflect the light from the optics module 130B into the target sub-volume 109 of the substrate 100 to be measured. The mirror 134 may extend across the back surface 100B of the substrate 100 and may be movable with the substrate 100 as a unit.

Both the lighting arrangements shown in FIGS. 2A and 4 can be used when measuring through hole parameters in transparent substrates such as glass. Both the lighting arrangements shown in FIGS. 2A and 4 are also suitable for use with opaque substrates. However, the lighting arrangement shown in FIG. 2A may work better for opaque substrates due to its higher contrast. The lighting arrangement shown in FIG. 4 has an advantage when there is no access to the back side of the substrate, such as when the substrate sits in a solid chuck, or when there is insufficient room behind the back side of the substrate to put the backlight illuminator.

Figure 2B:
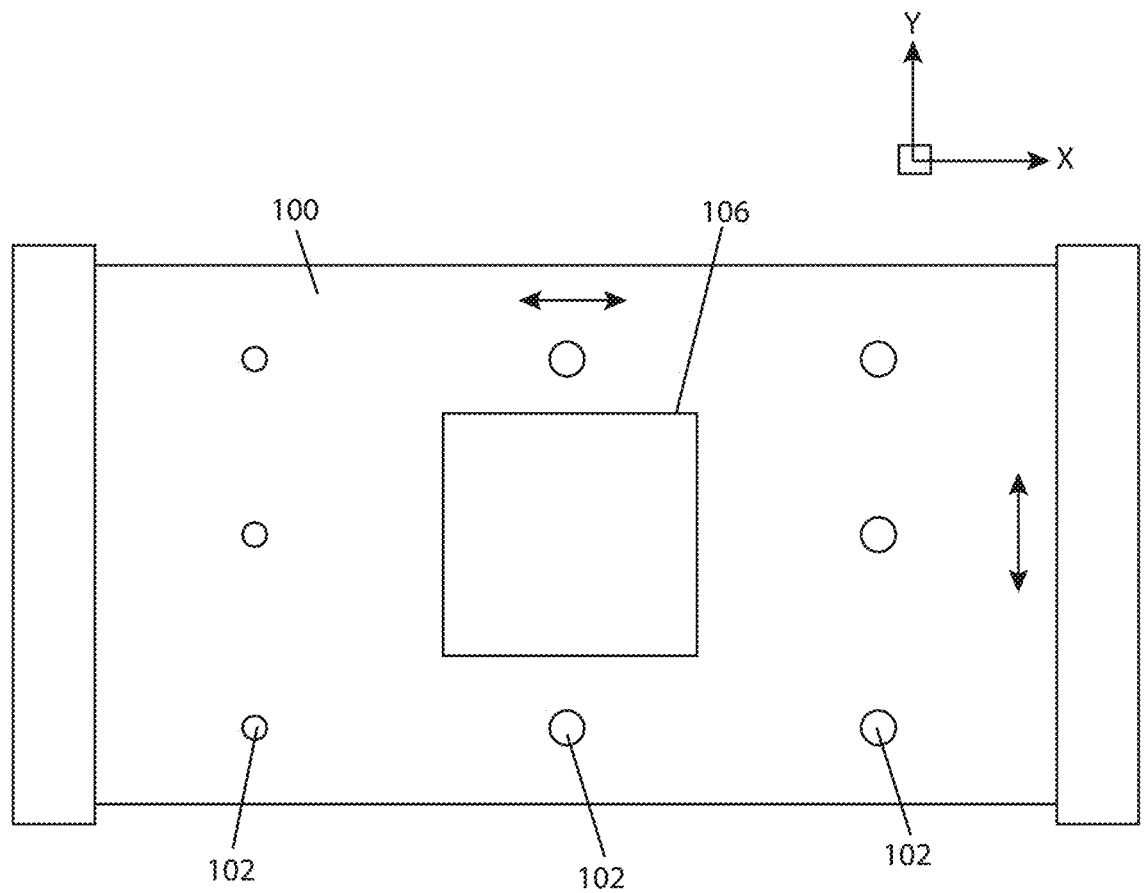
FIG. 2B is a top view of the system shown in FIG. 2A.

Returning to FIG. 2A, the field of view of the camera 106 (106' in FIG. 4) is limited to the diameter of the front surface of the telecentric lens 112 (i.e., the surface of the lens in opposed relation to the substrate 100). The field of view of the camera 106 (106' in FIG. 4) and the telecentric range of the telecentric lens 112 define the target sub-volume of the substrate whose image is acquired at any moment. However, scanning of the substrate will allow all the holes in the substrate or all the holes within a desired volume of the substrate to be measured. Scanning involves providing relative motion between the substrate 100 and the imaging apparatus 104. In one embodiment, the camera 106 and backlight illuminator 108 (or camera 106' and coaxial light source 130 in the embodiment of FIG. 4) may be held in fixed positions while the substrate 100 is translated in a plane perpendicular to the optical axis 115 of the camera 106 (i.e., the XY plane as shown in FIG. 2B). This will allow different sub-volumes of the substrate 100 to be moved into the field of view of the camera 106 over the scanning period. A translation stage 117 may be coupled to the substrate 100 and operated to translate the substrate 100 in the desired directions or plane. It is also possible to hold the substrate 100 fixed while translating the camera 106 and backlight illuminator 108 (or camera 106' and coaxial light source 130 in the embodiment of FIG. 4) relative to the substrate 100.

A controller 140 may be coupled to the camera 106 (106' in FIG. 4) to receive image data from the camera 106. The controller 140 may include a memory device 142 for storing the received image data and a processor 144 for processing the image data. The processor 144 may be configured to process the image data to determine one or more geometric parameters, such as clear aperture size, of through holes represented in the image data. The processor 144 may run a commercially available image processing software capable of analyzing the image data and extracting the desired geometric parameters from the image data. Examples of suitable commercial image processing software packages include, but are not limited to, HALCON by MVTec Software GmbH, MATLAB by MathWorks, Matrox Inspector with Matrox Imaging Library by Matrox, and NI Vision by National Instrument. The measured geometric parameters may be stored in the memory device 142 or other suitable storage device for later use. The controller 140 may also control translation of the substrate 100 during scanning of the substrate 100. For example, after processing the image data acquired by the camera 106 (106' in FIG. 4) for a current target sub-volume, the processor 144 may issue a command to the translation stage 117 to move the next target sub-volume into the field of view of the camera 106 (camera 106' for the embodiment in FIG. 4).

Table 1 below shows examples of telecentric lens options for acquiring images of through holes in thin substrates.

TABLE 1

| Option | Lens Magni-fication | Telecentric range or DOF (mm) | Camera Array | Field of View (mm) | Pixel Size (microns) |
|---|---|---|---|---|---|
| 1 | 1X | 0.9 | 3840 × 2748 | 6.4 × 4.8 | 1.7 |
| 2 | 1.33X | 0.5 | 3840 × 2748 | 4.8 × 3.6 | 1.3 |
| 3 | 2X | 0.2 | 3840 × 2748 | 3.2 × 2.4 | 0.85 |

Figure 5A:
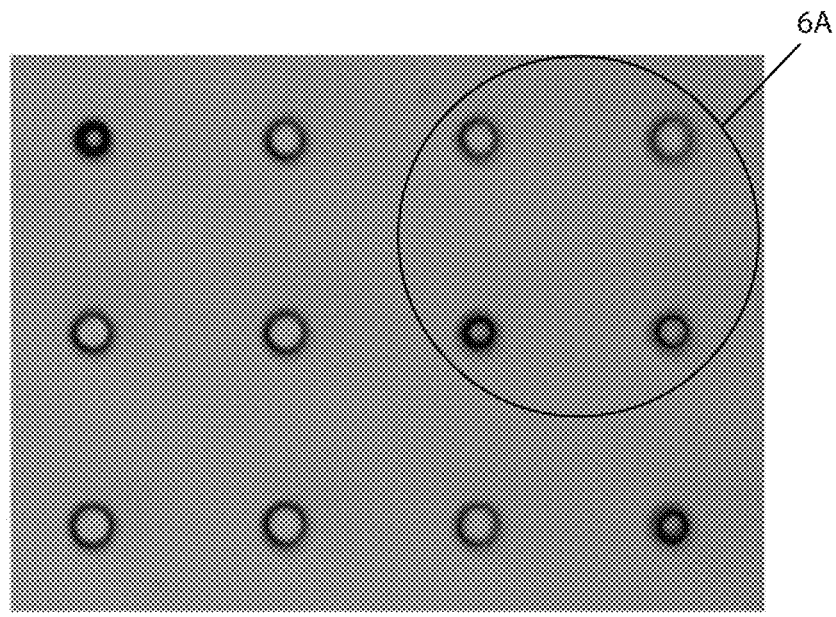
FIG. 5A is an image of a select sub-volume of a substrate acquired without using telecentric optics.
Figure 5B:
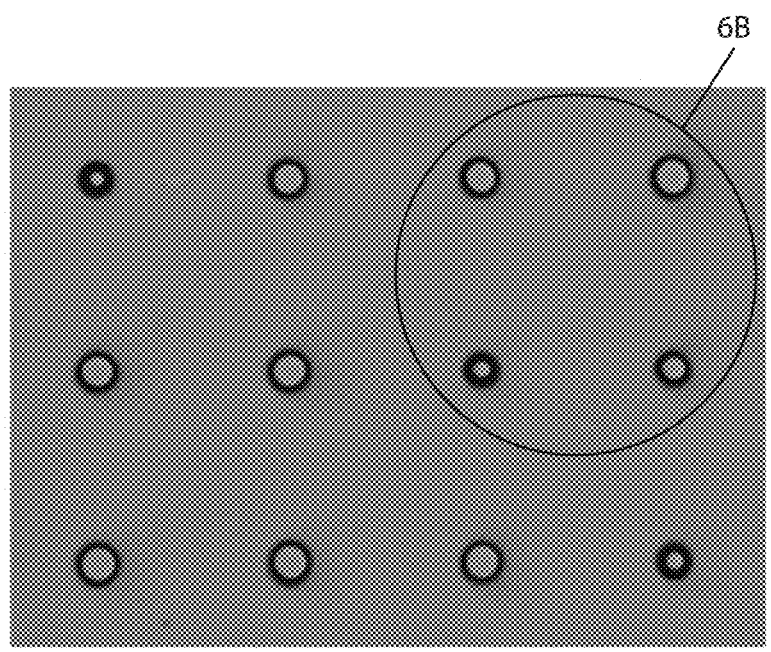
FIG. 5B is an image of a select sub-volume of a substrate acquired with use of telecentric optics.
Figure 6A:
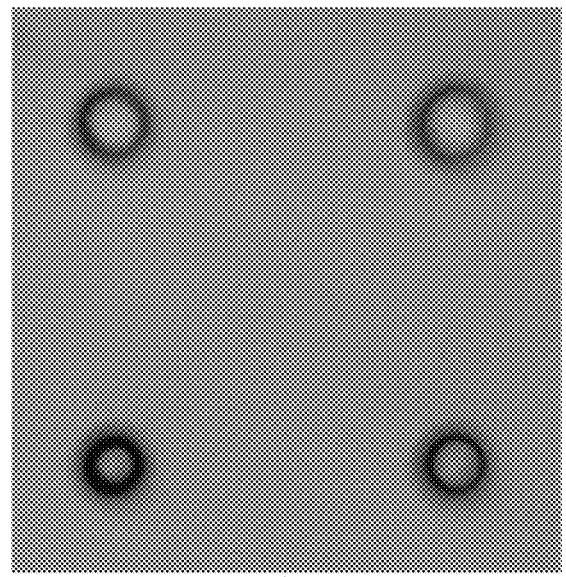
FIG. 6A is a close-up view of section 6A of FIG. 5A.
Figure 6B:
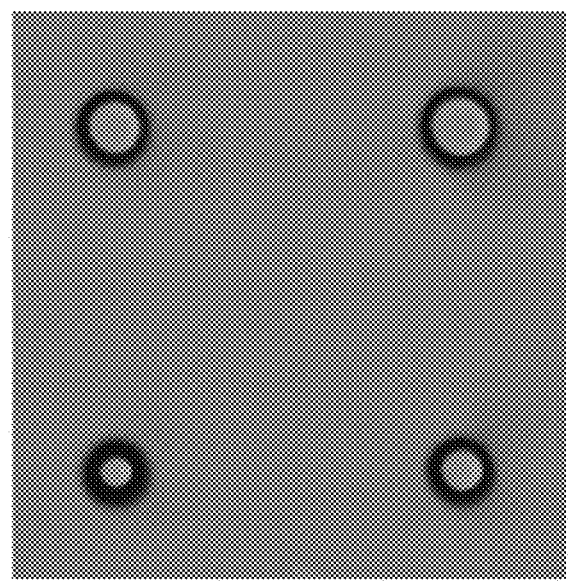
FIG. 6B is a close-up view of section 6B of FIG. 5B.

FIG. 5A shows an image of 3×4 holes acquired with VIEW Summit 650 Optical Coordinate Measuring Machine (OCMM). FIG. 5B shows an image of 3×4 holes acquired with a 10 megapixels camera using telecentric optics as listed in Option 1 in Table 1. Both images in FIGS. 5A and 5B were taken at 1× optical magnification with green backlighting. For the image in FIG. 5B, the backlight was a telecentric (i.e., collimated) light source. FIG. 6A shows a zoomed-in view of four of the holes in FIG. 5A. FIG. 6B shows a zoomed-in view of four of the holes in FIG. 5B. The image in FIG. 6B, which was acquired with telecentric optics, shows a much more defined outline of the holes than the image in FIG. 6A, which was acquired with the OCMM. The much smaller depth of field in the OCMM measurement system used to acquire the image of FIG. 6A prevented waists at different depths from being in focus simultaneously.

A procedure for measuring one or more geometric parameters of through holes in a substrate may include selecting the lens objective for a particular substrate thickness. Examples of lens objectives are given in Table 1. After the lens objective has been selected, the desired geometric parameters, such as clear aperture size, of holes in the substrate can be measured quickly in a few simple steps, as outlined below.

The substrate is moved in between the backlight illuminator 108 and the camera 106 for the system shown in FIG. 2A (or beneath the coaxial light source 130 and camera 106' for the system shown in FIG. 4) to position a target sub-volume of the substrate in the field of view of the camera.

The target sub-volume is illuminated, and an image of the illuminated target sub-volume is acquired.

The acquired image is processed to determine at least one geometric parameter of each through hole in the target sub-volume. Processing involves detecting changes in light levels, or contrast, in the acquired image. Changes in contrast can define boundaries, or lines, within the image. These lines can be extended to create objects like segments, circles, ellipses, and the like, and then parameters such as diameter or distance can be extracted. The acquired image is typically processed on a computer using commercially available image analysis software. Examples of suitable commercial imaging processing software packages include, but are not limited to, HALCON by MVTec Software GmbH, MATLAB by MathWorks, Matrox Inspector with Matrox Imaging Library by Matrox, and NI Vision by National Instrument.

The geometric parameter values for each hole are recorded. The acquired image may be discarded after recording the geometric parameter values to save storage space since the high-resolution images can be quite large.

The substrate is then translated relative to the camera and lighting arrangement to place another target sub-volume of the substrate in the field of view of the camera and within the illumination volume provided by the lighting arrangement. The acquiring of the image of the target sub-volume, processing of the image, and recording of geometric parameter values for each hole in the target sub-volume are repeated for the new target sub-volume.

The procedure described above can be automated to scan an entire substrate or a small area within the substrate. The duration of a measurement run is determined predominantly by how fast the substrate can be translated and how fast the images can be acquired and processed and not by the number of holes in the field of view. A substrate with holes ranging from hundreds to thousands can be quickly measured using an automated procedure and any of the setups described in FIGS. 2A and 4. In some embodiments, multiple cameras 106, 106' may be utilized to increase the speed of scanning the substrate. In some embodiments, multiple illuminator 108 may be used in conjunction with the multiple cameras. In some embodiments, there may be constant relative movement between the substrate and cameras 106, 106' and illuminator 108 or light source 130 may turn on and off (e.g., strobe) at regular intervals for cameras 106, 106' to take images.

While the invention has been described with respect to a limited number of embodiments, those skilled in the art of, having benefit of this disclosure, will appreciate that other embodiments can be devised which do not depart from the scope of the invention as disclosed herein. Accordingly, the scope of the invention should be limited only by the accompanying claims.

The invention claimed is:

1. A method of measuring geometric parameters of through holes in a substrate, comprising:
positioning a camera comprising an image sensor and a lens having a depth of field greater than a thickness of the substrate at a measuring station, the image sensor having a pixel count of at least 10 megapixels and a pixel size of 1.7 microns or less;
positioning a select sub-volume of the substrate within a field of view of the camera and within the depth of field, wherein the select sub-volume has a front side, a back side, and at least one through hole,
the front side being positioned in opposing relation to the lens, and the at least one through hole having a first side at the front side of the select sub-volume and a second side at the back side of the select sub-volume;

illuminating the select sub-volume by directing light from a light source comprising a telecentric illuminator at the back side of the select sub-volume, wherein the camera and light source are arranged on opposite sides of the substrate;

capturing an image of the select sub-volume on the image sensor; and processing the image to measure at least a minimum transverse dimension of the through hole along a length of the through, the minimum transverse dimension of the through hole being disposed between the first side and the second side of the through hole.

2. The method of claim 1, wherein the substrate has a thickness of 1 mm or less.

3. The method of claim 1, wherein the lens is a telecentric lens.

4. The method of claim 1, further comprising effecting a lateral relative motion between the camera and the substrate to position another sub-volume of the substrate within the field of view of the camera and within the depth of field.

5. The method of claim 4, further comprising illuminating the another sub-volume with light, capturing an image of the another sub-volume on the image sensor, and processing the image of the another sub-volume to determine at least one geometric parameter of at least one hole in the another sub-volume.

6. The method of claim 5, wherein illuminating the another sub-volume comprises effecting a lateral relative motion between a source of the light and the substrate such that the another sub-volume is within an illumination volume of the light.

7. The method of claim 1, wherein processing the image comprises detecting changes in contrast in the image.

8. The method of claim 1, wherein the minimum transverse dimension is a minimum diameter of the through hole between the first side and the second side of the through hole.

9. The method of claim 1, wherein the through hole comprises an hour glass cross-sectional profile.

10. A system for measuring geometric parameters of through holes in a substrate, comprising:

a camera comprising an image sensor and a lens having a depth of field greater than a thickness of the substrate, the image sensor having a pixel count of at least 10 megapixels and a pixel size of 1.7 microns or less, the camera positioned at a select working distance relative to the substrate such that a select sub-volume of the substrate is within a field of view of the camera and within the depth of field;

a lighting arrangement comprising a telecentric illuminator for illuminating the select sub-volume; and a processor configured to receive image data from the camera and measure from the image data at least a minimum transverse dimension of a through hole in the select sub-volume along a length of the through hole, wherein the select sub-volume has a front side and a back side, the front side being in opposing relation relative to the lens, wherein the lighting arrangement comprises a light source positioned to direct a light beam at the back side of the select sub-volume, the camera and light source being arranged on opposite sides of the substrate, and wherein the at least one through hole has a first side at the front side of the select sub-volume and a second side at the back side of the select sub-volume and the minimum transverse dimension of the through hole is disposed between the first side and the second side of the through hole.

11. The system of claim 10, wherein the lens is a telecentric lens.

12. The system of claim 10, further comprising a translation mechanism coupled to the substrate and operable to translate the substrate laterally relative to the camera.

13. The system of claim 10, wherein the minimum transverse dimension is a minimum diameter of the through hole between the first side and the second side of the through hole.

14. The system of claim 10, wherein the through hole comprises an hour glass cross-sectional profile.

* * * * *

UNITED STATES PATENT AND TRADEMARK OFFICE
CERTIFICATE OF CORRECTION

| | |
|---|---|
| PATENT NO. | : 10,794,679 B2 |
| APPLICATION NO. | : 15/632919 |
| DATED | : October 6, 2020 |
| INVENTOR(S) | : Uta-Barbara Goers et al. |

It is certified that error appears in the above-identified patent and that said Letters Patent is hereby corrected as shown below:

On the Title Page

On page 3, in Column 2, item (56), Other Publications, Line 23, delete "Microelectronis" and insert -- Microelectronics --, therefor.

In the Claims

In Column 9, Line 13, Claim 1, delete "through," and insert -- through hole, --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*